Nov. 28, 1939.  A. P. FERGUESON  2,181,367
FENDER SKIRT LOCKING MECHANISM
Original Filed Oct. 9, 1936  2 Sheets-Sheet 1
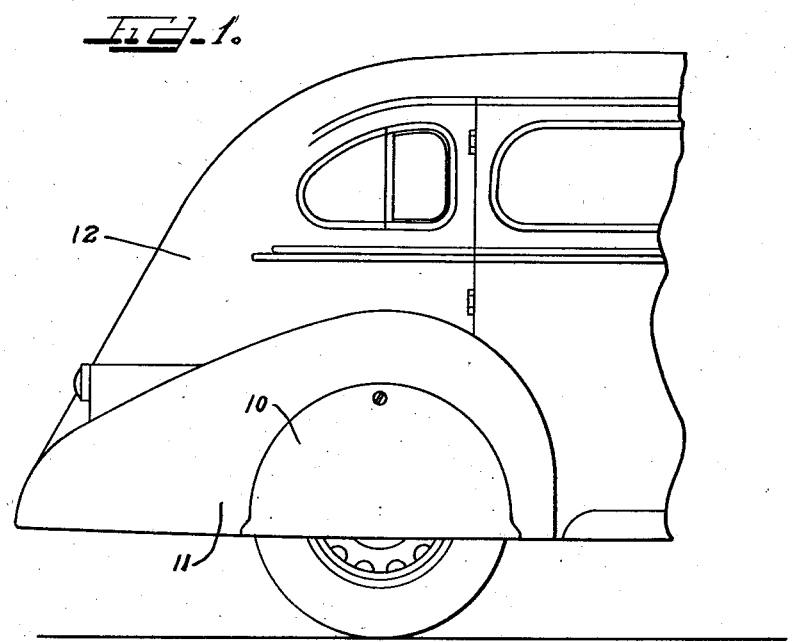
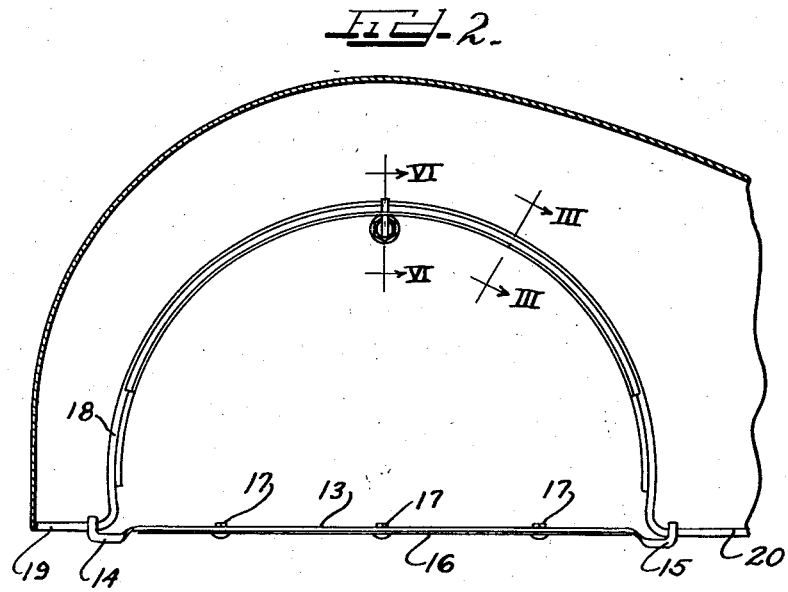
Inventor
ARTHUR P. FERGUESON.
by
Attys.

Nov. 28, 1939.   A. P. FERGUESON   2,181,367
FENDER SKIRT LOCKING MECHANISM
Original Filed Oct. 9, 1936   2 Sheets-Sheet 2
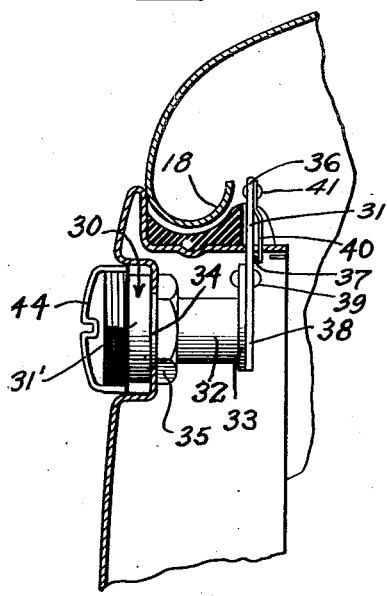
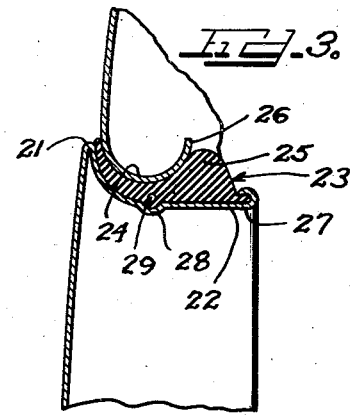
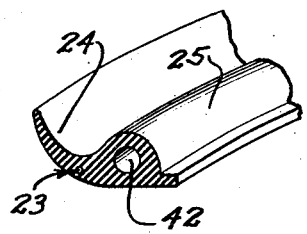
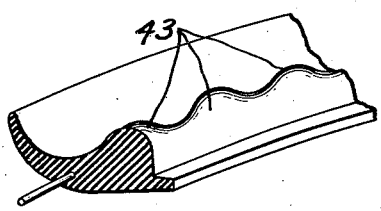
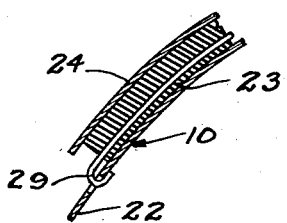
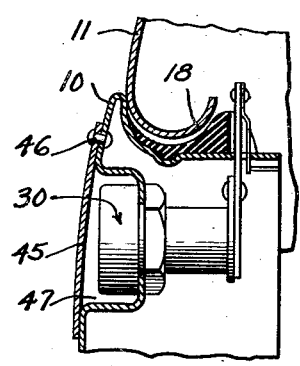
Inventor
ARTHUR P. FERGUESON.

Patented Nov. 28, 1939

2,181,367

UNITED STATES PATENT OFFICE

2,181,367

FENDER SKIRT LOCKING MECHANISM

Arthur P. Fergueson, Detroit, Mich., assignor, by mesne assignments, to Houdaille-Hershey Corporation, Detroit, Mich., a corporation of Michigan Original application October 9, 1936, Serial No. 104,766. Divided and this application July 31, 1937, Serial No. 156,622

5 Claims. (Cl. 70—258)

This invention relates to ornamental fender skirts, and more particularly to a novel means for securing an ornamental fender skirt in position on a vehicle fender.

This is a division of my co-pending application for "Ornamental fender skirt," Serial No. 104,766, filed October 9, 1936, and assigned to the same assignee as the present invention.

In designing ornamental fender skirts or shields of the type which are adapted to cover the usual wheel access opening in a vehicle fender, it is important that the means which is employed to secure the fender skirt in desired position be simple and quick to operate both in assembling the fender skirt on the vehicle fender and in removing it therefrom. It must also possess the desired degree of ruggedness when in use and be substantially free from vibration and noise.

It is an object of this invention to provide a novel ornamental fender skirt which possesses the above highly desirable characteristics.

It is a further object of this invention to provide an improved fender skirt which is economical to manufacture and which is rugged and reliable in use.

It is a still further object of this invention to provide a novel means for retaining the fender engaging edge portion of an ornamental fender skirt in desired position on a vehicle fender.

Another object of this invention is to provide a novel lock mechanism for preventing unauthorized removal of an ornamental fender skirt from the vehicle fender.

Another and further object of this invention is to provide a novel combination of vehicle fender and ornamental fender skirt.

The novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawings, in which:

Figure 1 is a side elevational view of the rear part of an automobile having the usual form of vehicle fender and one embodiment of my novel ornamental fender skirt mounted thereon;

Figure 2 is a side elevational view, partly in cross-section, of a vehicle fender and an ornamental fender skirt of the type illustrated in Figure 1, as viewed from the interior of the automobile body looking outwardly;

Figure 3 is an enlarged fragmentary view illustrating the novel fender engaging means carried on the ornamental fender skirt of Figure 1;

Figure 4 is a fragmentary perspective view of a slightly modified form of fender engaging means;

Figure 5 is a view similar to Figure 4, but illustrates a still further modification of the fender engaging means;

Figure 6 is an enlarged fragmentary view slightly in cross-section, illustrating in greater detail the lock mechanism shown on the ornamental fender skirt of Figures 1 and 2;

Figure 7 is a view similar to Figure 6, but illustrating a modified form of dust cap construction for the lock mechanism;

Figure 8 is a cross-sectional view of a portion of the fender skirt fastening flange.

In the embodiment of this invention illustrated in Figures 1 to 3 and 6 of the drawings, an ornamental fender skirt 10 of the trunnion supported type is mounted on a vehicle fender 11 of an automobile 12. The bar 13 which extends beyond the fender skirt 10 at either end to form trunnion members 14 and 15 is secured to the underturned edge 16 of the fender skirt 10 in any suitable manner, such as by bolts 17. The trunnion members 14 and 15 are shaped to extend around the opening defining underturned edge 18 of the fender 11 into supporting engagement with the underturned base edges 19 and 20 of the fender 11.

The curved edge portion of the fender skirt 10 is bent back on itself to form a fender engaging edge portion 21 and a rearwardly extending flange portion 22 (as may be seen best in Figure 3 of the drawings). Secured on the upper side of the flange portion 22 is a non-metallic resilient strip 23 composed of any suitable non-metallic material such as rubber. The strip 23 includes an outwardly opening channel portion 24 which is adapted to be seated on the underturned opening defining edge 18 of the fender 11 and a flange portion 25 which is adapted to engage the rearward face 26 of the underturned marginal edge 18.

The strip 23 may be secured to the flange portion 22 in any suitable manner. As shown in the drawings, the strip 23 is provided with a rearwardly extending lip 27 about which the outer extremity of the flange portion 22 is rolled. To further secure the strip 23 to the fender skirt 10, the flange portion 22 is provided with a circumferentially disposed groove or depression 28. The strip 23 has a steel wire 29 embedded therein opposite the groove 28. Opposite ends (not shown) of the steel wire 29 are secured under slight tension to the fender skirt 10, thereby causing a portion of the lower edge of the strip 23 to be deformed into the groove 28 of the flange portion 22. This particular type of mounting prevents not only upward displacement of the strip 23 but also lateral displacement thereof.

From the above description, it will readily be understood that the fender skirt 10 may be mounted on the vehicle fender 11 by inserting the trunnion members 14 and 15 in the underturned edges 19 and 20 of the fender 11 and then rocking the fender skirt 10 about the trunnion members into desired position. As the fender engaging edge portion 21 rocks into position, the flange portion 25 of the resilient strip 23 is deformed to a sufficient extent to pass under the underturned opening defining edge 18 of the fender 11. As the flange portion 25 of the strip 23 passes under the lowermost point of the underturned edge 18, the flange portion 25 resumes its normal shape due to the resiliency of the material and thus engages the rear face of the underturned edge 18. Downward displacement of the ornamental fender skirt 10 being prevented by the trunnion members 14 and 15, and lateral movement of the curved edge portion of the fender skirt 10 being prevented by fender engaging edge 21 and the flange 25, the fender skirt 10 is securely mounted on the fender 11.

To dismount the ornamental fender skirt 10 from the fender 11, it is simply necessary to force the upper part of the fender skirt 10 outwardly against the resilient action of the flange portion 25 of the strip 23 until the flange portion 25 has passed beneath the lowermost point of the underturned opening defining edge portion 18 of the fender 11. The fender skirt 10 may then be lifted out of engagement with the underturned base edges 19 and 20 of the fender 11, and the ornamental fender skirt is completely dismounted.

In order to prevent unauthorized removal of the fender skirt 10 from the fender 11, a lock mechanism 30 is secured to the upper part of the ornamental fender skirt 10 and inlcudes a locking arm 31 which is adapted to extend upwardly from the fender skirt 10 behind the rear face of the underturned opening defining edge 18. The lock mechanism 30 may be of any suitable design, preferably key-operated, and includes a lock body 30', a key-operated rotatable cylinder 32, and an eccentric end plate 33. The lock body 30' and rotatable cylinder 32 extend through an aperture 34 in the upper part of the ornamental fender skirt 10, the lock mechanism being firmly clamped in place by means of a clamping nut 35. The locking arm 31 of the lock mechanism 30 is pivotally mounted to the eccentric plate 33, as indicated in Figure 6.

It will thus be readily understood that as the rotatable cylinder 32 is moved above its axis, the locking end 36 of the arm 31 is moved vertically, an aperture 37 being provided in the rearwardly extending flange portion 22 through which the locking arm 31 extends. The locking arm 31 includes a tail portion 38 which overlies the end face of the eccentric plate 33. This provision of a tail piece 38 on the locking arm 31 tends to relieve the strain on the locking arm mounting stud 39 when an unauthorized attempt is made to remove the fender skirt 10. The locking arm 31 may be biased against the front wall of the aperture 37, if desired, by means of a leaf spring 40 which is secured to the locking arm 31 by means of a suitable rivet 41 and which extends downwardly through the aperture 37, as indicated in the drawings.

In Figure 4, I have illustrated a slightly modified form of strip for engaging the underturned opening defining edge of the fender 11. The strip of non-metallic resilient material in this instance is formed with a longitudinally extending hole 42 therein. This provision of a longitudinal hole in the flange 25 of the strip 23 has the effect of lessening the amount of force necessary to deform the flange 25 when the flange 25 passes under the lowermost point of the underturned opening defining edge 18.

A second modification of the strip 23 is indicated in Figure 5 of the drawings. Instead of providing the strip 23 with a continuous bead-like flange 25, it is provided with a plurality of protuberances 43 which operate in the same manner to engage the rear face of the underturned opening defining edge 18 of the fender 11 to retain the ornamental fender skirt 10 in desired position thereon. In some instances, it has been found that the use of protuberances, instead of a continuous solid flange or a continuous hollow flange, is desirable. The provision of protuberances reduces the amount of force necessary to deform the strip but presents a more durable construction than that shown in Figure 4.

In order to prevent foreign matter, such as dust, from getting into the key aperture (not shown) of the lock mechanism 30, it has sometimes been found desirable to provide a cover or closure member for the head of the lock mechanism 30. In Figure 6 of the drawings, I have illustrated one form of dust cap at 44. As will readily be understood from the drawings, the dust cap 44 is adapted to be screwed on the head of the lock body 30'.

In Figure 7 of the drawings, I have illustrated a slightly modified form of dust cap construction which includes a flap 45 pivotally mounted by a rivet 46 for movement along the surface of the fender skirt 10. When access to the key aperture (not shown) of the lock mechanism 30 is desired, it is simply necessary to rotate the flap 45 about the rivet 46 until the recess cavity 47 in which the head of the lock mechanism 30 lies is open.

From the above description, it will be apparent that I have provided an extraordinarily simple means for securing an ornamental fender skirt to a vehicle fender. Although the ornamental fender skirt has been described as being of the trunnion supported type, it will be obvious to those skilled in the art that the fender skirt may be supported at its lower extremities in a wide variety of manners without departing from the spirit and scope of this invention. Furthermore, although the vehicle fender has been illustrated as being of the high crown type having underturned marginal edges, it is to be understood that the ornamental fender skirt may be employed with equal success with any type of fender having underturned marginal edges or the like.

While I have shown particular embodiments of my invention, it will, of course, be understood that I do not wish to be limited thereto, since many modifications may be made, and I therefore contemplate by the appended claims to cover all such modifications as fall within the true spirit and scope of my invention.

I claim as my invention:

1. In an ornamental fender skirt, the sub-combination comprising a lock mechanism secured to said skirt in proximity to its fender engaging edge having a key-operated rotatable cylinder, and a locking arm eccentrically mounted to said cylinder, said locking arm having a tail portion extending across the end face of said cylinder, whereby destruction of said locking mechanism by unauthorized attempts to remove said skirt from its locked position is substantially eliminated.

2. A lock mechanism for an ornamental fender skirt having a fender engaging portion adapted to overlie the opening defining edge of a vehicle fender, a flange on said fender skirt in proximity to said fender engaging portion adapted to extend rearwardly beneath said opening defining edge of said fender, said flange having an aperture near its rearwardmost edge, said lock mechanism being secured to said fender skirt beneath said flange in proximity to said aperture and comprising a rotatable cylinder, and a locking arm extending through said aperture and eccentrically mounted on said cylinder, whereby said arm is adapted for movement into and out of locking engagement with the rear face of said vehicle fender.

3. A lock mechanism for an ornamental fender skirt having a fender engaging portion adapted to overlie the opening defining edge of a vehicle fender, a flange on said fender skirt in proximity to said fender engaging portion adapted to extend rearwardly beneath said opening defining edge of said fender, said flange having an aperture near its rearwardmost edge, said lock mechanism being secured to said fender skirt beneath said flange in proximity to said aperture and comprising a rotatable cylinder, and a locking arm extending through said aperture and eccentrically mounted on said cylinder, whereby said arm is adapted for movement into and out of locking engagement with the rear face of said vehicle fender, said locking arm having a tail portion which extends across and frictionally engages the end face of said cylinder.

4. For an ornamental fender skirt having a fender engaging portion adapted to overlie the opening defining edge of a vehicle fender, a flange on said fender skirt in proximity to said fender engaging portion adapted to extend rearwardly beneath said opening defining edge of said fender, said flange having an aperture near its rearwardmost edge; a lock mechanism secured to said fender skirt beneath said flange in proximity to said aperture and comprising a rotatable cylinder, a locking arm extending through said aperture and eccentrically mounted on said cylinder, whereby said arm is adapted for movement into and out of locking engagement with the rear face of said vehicle fender, said locking arm having a leaf spring secured thereto and extending through said aperture to bias said arm against the wall thereof.

5. For an ornamental fender skirt having a fender engaging portion adapted to overlie the opening defining edge of a vehicle fender, a flange on said fender skirt in proximity to said fender engaging portion adapted to extend rearwardly beneath said opening defining edge of said fender, said flange having an aperture near its rearwardmost edge; a lock mechanism secured to said fender skirt beneath said flange in proximity to said aperture; and comprising a rotatable cylinder, a locking arm extending through said aperture and eccentrically mounted on said cylinder, whereby said arm is adapted for movement into and out of locking engagement with the rear face of said vehicle fender, the head of said lock mechanism being provided with a movable dust cap.

ARTHUR P. FERGUESON.